United States Patent [19]
Dale et al.

[11] Patent Number: 5,849,566
[45] Date of Patent: Dec. 15, 1998

[54] COMPOSITION FOR ACCELERATING THE DECOMPOSITION OF HYDROCARBONS

[75] Inventors: Parker Dale, Newport Beach; John E. Hill, Irvine, both of Calif.

[73] Assignee: Neozyme International, Inc., Newport Beach, Calif.

[21] Appl. No.: 787,866

[22] Filed: Jan. 23, 1997

Related U.S. Application Data

[60] Provisional application Nos. 60/010,887, 60/010,888 and 60/010,883, all filed Jan. 31, 1996.

[51] Int. Cl.$^6$ .................................................... C07C 00/00
[52] U.S. Cl. ............................................ 435/262; 435/264
[58] Field of Search ................................. 435/262.5, 264

[56] References Cited

U.S. PATENT DOCUMENTS

| | | | |
|---|---|---|---|
| 2,424,049 | 7/1947 | Parker et al. | 134/3 |
| 3,404,068 | 10/1968 | Batistoni | 195/61 |
| 3,519,570 | 7/1970 | McCarty | 252/135 |
| 3,635,797 | 1/1972 | Battistoni et al. | 195/56 |
| 3,880,739 | 4/1975 | Leavitt . | |
| 4,009,119 | 2/1977 | Poschmann et al. | 252/358 |
| 4,127,447 | 11/1978 | Griffith et al. | 195/116 |
| 4,541,944 | 9/1985 | Sanderson | 252/95 |
| 4,822,490 | 4/1989 | Dyadechko et al. | 210/611 |
| 5,041,236 | 8/1991 | Carpenter et al. | 252/174.12 |
| 5,071,765 | 12/1991 | Wiatr | 435/264 |
| 5,075,008 | 12/1991 | Chigusa et al. | 210/610 |
| 5,108,746 | 4/1992 | Rho et al. | 424/94.2 |
| 5,128,262 | 7/1992 | Lindoerfer et al. | 435/264 |
| 5,133,892 | 7/1992 | Chun et al. | 252/90 |
| 5,139,945 | 8/1992 | Liu | 435/232 |
| 5,160,488 | 11/1992 | Stillman | 435/262.5 |
| 5,227,067 | 7/1993 | Runyon | 210/606 |
| 5,326,477 | 7/1994 | Fugua et al. | 210/632 |
| 5,352,386 | 10/1994 | Rahman et al. | 252/548 |
| 5,352,387 | 10/1994 | Rahman et al. | 252/548 |
| 5,358,656 | 10/1994 | Humphreys et al. | 252/174.12 |
| 5,364,789 | 11/1994 | Guinn et al. | 435/262.5 |
| 5,369,031 | 11/1994 | Middleditch et al. | 435/284 |
| 5,372,944 | 12/1994 | Swanson | 435/252.1 |
| 5,385,685 | 1/1995 | Humphreys et al. | 252/174.17 |
| 5,389,279 | 2/1995 | Au et al. | 252/108 |
| 5,407,577 | 4/1995 | Nghiem | 210/606 |
| 5,466,396 | 11/1995 | Madison et al. | 252/557 |
| 5,503,766 | 4/1996 | Kulperger | 252/174.12 |
| 5,520,835 | 5/1996 | Sivik et al. | 252/102 |
| 5,560,872 | 10/1996 | Rahman et al. | 510/392 |

OTHER PUBLICATIONS

A copy of International Search Report for counterpart PCT Application No. PCT/US97/01391.

A copy of International Search Report for related PCT Application No. PCT/US97/01551.

A copy of International Search Report for related PCT Application No. PCT/US97/01616.

*Primary Examiner*—David A. Redding
*Attorney, Agent, or Firm*—Merchant, Gould, Smith, Edell, Welter & Schmidt

[57] ABSTRACT

A composition and method for accelerating the decomposition of hydrocarbons. The composition comprises a non-ionic surfactant; sodium benzoate; imidazolidinyl urea; diazolidinyl urea; and a fermentation supernatant derived from a *Saccharomyces cerevisiae* culture. The method comprising applying an aqueous composition comprising a non-ionic surfactant, a preservative and a fermentation supernatant derived from a *Saccharomyces cerevisiae* culture to hydrocarbons to be decomposed.

16 Claims, No Drawings

COMPOSITION FOR ACCELERATING THE DECOMPOSITION OF HYDROCARBONS

RELATED APPLICATIONS

This application is based on Provisional Applications Ser. No. 60/010,887, Ser. No. 60/010,888 and Ser. No. 60/010,883 all filed Jan. 31, 1996, which are incorporated herein by reference.

1. Field of the Invention

The present invention is directed at a biologically based composition for accelerating the decomposition of hydrocarbons present in water, soil, air or on surfaces and for deodorizing the water, soil, air or surfaces being treated.

2. Background of the Invention

Hydrocarbons from petroleum products are an environmental pollutant which contaminate soil, water and air. These products pose a threat to wildlife and to man when they are introduced into water-ways and soil. When introduced into soil the pollutants may eventually percolate down into ground water, and hence wells and reservoirs, making the water from these sources unsafe for consumption. Oil spills are another environmental hazard which threaten wildlife. Oil discharged into water eventually washes up onto the coast line and destroys the coastal ecosystem.

In addition, contamination of water in an industrial setting can pose a fire hazard and a disposal problem. For example contaminated water such as ship's bilge water and industrial effluent may be contaminated with fuels and oils which have to be disposed in a manner which does not damage the environment.

Also, many manufacturing processes leave a film of oil or other hydrocarbons on the product being manufactured. This is particularly true for can manufacturing facilities. This oily film must be removed prior to introducing a protective coating into the can. Currently, the oily film is remove from the surface of the can with an acid wash, such as a sulfuric acid wash. Such washes, while they remove the oil from the can, have a limited use as the wash solutions have to be replaced frequently due to oil build-up.

The surfaces of the cans or food handling facilities must also be further cleaned to remove the cleaning agent. After cleaning, the acid or detergent, and the water used to remove them from the surfaces being cleaned, must be disposed of which can lead to pollution of waterways located near the food handling or can manufacturing facilities. Also the chemicals and acids used as cleaning agents can be hazardous to the health and safety of workers who are exposed to them.

A number of processes and compositions have been developed which are directed at specific contaminants, for example: *Xanthomonas maltophilia* and *Bacillus thuringiensis* have been used to degrade polar organic solvents (U.S. Pat. No. 5,369,031); a combination of amylase, lipase and/or protease have been used to digest colloidal material such as starch, grease, fat and protein (U.S. Pat. No. 5,882, 059); and a yeast fermentation composition described in U.S. Pat. No. 3,635,797 has been described as effective in deodorizing sewage and ponds and in the degradation of hydrocarbon waste. However, some products, such as that described in U.S. Pat. No. 3,635,797 have been found to be unstable and yielded variable results from one batch to another. Other compositions described above are directed at only a specific contaminant and none have proven to be successful in accelerating the rate of degradation of hydrocarbons.

It is desirable to provide a composition for degrading or accelerating the natural rate of degradation of hydrocarbons, such as petroleum products which contaminate water, soil and air and for removing hydrocarbons from surfaces. Preferably such as composition would produce end products which would be non-toxic to the environment. Additionally, it is desirable that such a composition eliminate airborne contaminants to deodorize the contaminated material.

Summary of the Invention

The present invention is directed at a composition for accelerating the decomposition of hydrocarbons. The composition comprises a non-ionic surfactant; sodium benzoate; imidazolidinyl urea; diazolidinyl urea; and a fermentation supernatant derived from a *Saccharomyces cerevisiae* culture.

The method of the present invention comprises applying an aqueous composition comprising a non-ionic surfactant, a preservative and a fermentation supernatant derived from a *Saccharomyces cerevisiae* culture to hydrocarbons to be decomposed.

DETAILED DESCRIPTION

The present invention is directed at a composition for accelerating the decomposition of hydrocarbons.

Oxidative biological and chemical processes in aqueous environments are limited by the low solubility of oxygen in water. This physical limitation is defined by Henry's Law. It states that when the temperature is kept constant, the amount of a gas that dissolves into a liquid is proportional to the pressure exerted by the gas on the liquid.

The solubility of oxygen in pure water is only about 10 parts per million (ppm) at ambient temperatures and at one atmosphere pressure. The composition of the present invention has been observed to increase oxygen in water above levels which would be anticipated by Henry's Law.

For most aerobic bioprocesses, whether a hydrocarbon containing wastewater treatment system or a biotechnology fermentation, dissolved oxygen is quickly consumed so that replenishing it becomes the factor which limits the rate of the process. Therefore, the most critical component of a bioprocess design is the means for the mass transfer of oxygen into the liquid phase of the process. For an actively respiring culture of bacteria at a cell density of about $10^9$ cells/ml, oxygen in the liquid medium must be replaced about 12 times per minute to keep up with the oxygen demand of the bacteria.

Water is typically aerated by increasing the contact surfaces between the gaseous and liquid phases. This can be done either by introducing a source of oxygen into a bulk liquid phase or by flowing dispersed water through a bulk gaseous (air) phases. Regardless of whether the gaseous or liquid phases dominate the oxygenation process, the mass transfer of oxygen, or other gas, is accomplished by introducing gas bubbles into the liquid phase. The efficiency of gas-liquid mass transfer depends to a large extent on the characteristics of the bubbles.

Bubble behavior strongly affects the following mass-transfer parameters:

Transfer of oxygen from the interior of the bubble to the gas-liquid interface;

Movement of oxygen across the gas-liquid interface; and

Diffusion of oxygen through the relatively stagnant liquid film surrounding the bubble.

It is of fundamental importance in the study of bubbles to understand the exchange of gases across the interface between the free state within the bubble and the dissolved state outside the bubble. It is generally agreed that the most important property of air bubbles in a bioprocess is their size. For a given volume of gas, more interfacial area (a) between the gas phase and liquid phase is provided if the gas is dispersed into many small bubbles rather than a few large ones. Small bubbles, 1 to 3 mm, have been shown to have the following beneficial properties not shared by larger bubbles:

Small gas bubbles rise more slowly than large bubbles, allowing more time for a gas to dissolve in the aqueous phase. This property is referred to as gas hold-up, concentrations of oxygen in water can be more than doubled beyond Henry's Law solubility limits. For example, after a saturation limit of 10 ppm oxygen is attained; at least another 10 ppm oxygen within small bubbles would be available to replenish the oxygen.

Once a bubble has been formed, the major barrier for oxygen transfer to the liquid phase is the liquid film surrounding the bubble. Biochemical engineering studies have concluded that transport through this film becomes the rate-limiting step in the complete process, and controls the overall mass-transfer rate. However, as bubbles become smaller, this liquid film decreases so that the transfer of gas into the bulk liquid phase is no longer impeded.

Surfactants in water can lead to the formation of very small bubbles, less than 1 mm in diameter. These small bubbles, referred to as microbubbles, are the result of the reduced surface tension at the interface between the gas/liquid interface caused by surfactants.

As large concentrations of gas are introduced into a solution such as by a chemical reaction or other mechanism, the liquid phase can become supersaturated if nucleation centers for the formation of bubbles are absent. At this point microbubbles can then form spontaneously, nucleating large bubble formation, and sweeping dissolved gases from the solution until supersaturation again occurred. In the presence of surfactants, it is likely that a larger portion of gas would remain in the solution as stable bubbles.

Microbubbles exposed to a dispersion of gas in a liquid show colloidal properties and are referred to as colloidal gas aphrons (CGA). CGA differ from ordinary gas bubbles in that they contain a distinctive shell layer consisting of a low concentration of a surfactant.

The composition of the present invention exhibits desirable properties associated with surfactant microbubbles. However, the microbubbles formed with the composition of the present invention appear to increase the mass transfer of oxygen in liquids. Without being bound by scientific theory, there are several possible explanations for this difference:

The earlier described surfactant microbubbles involved the use of pure synthetic surfactants that were either anionic or cationic. The surfactants formulated into the composition of the present invention are nonionic and are blended with biosurfactants which significantly alter the properties of bubble behavior.

The composition of the present invention requires a much lower concentration of surfactants for microbubble formation. It has been suggested that surfactant concentrations must approach the critical micelles concentration (CMS) of a surfactant system. In the composition of the present invention, microbubbles are formed below estimated CMCs for the surfactants used. This suggests that the composition of the present invention microbubbles are the result of aggregates of surfactant molecules with a loose molecular packing more favorable to gas mass transfer characteristics.

A surface consisting of fewer molecules would be more gas permeable than a well-organized micelle containing gas.

In addition to surfactants, the composition of the present invention contains biologically derived catalysts. Both of these components tend to be amphiphilic, that is they have pronounced hydrophobic and hydrophilic properties. Amphiphilic molecules tend to cluster in water to form allow molecular weight aggregates which (as surfactant concentrations increase) result in micelle formation at concentrations ranging from $10^{-2}$ to $10^{-14}$M. Aggregates of these amphiphilic molecules are the nuclei for microbubble formation.

The composition of the present invention appears to increase oxygen levels in fluids. Without being bound by scientific theory, it is believed this effect can be explained by either or both of two mechanisms increased mass transfer of gases resulting from the interactions of non-ionic surfactants and other components of the composition of the present invention and delayed release of gases from microbubbles so that oxygen can be dispersed throughout a liquid rather than just at the point of introduction.

With either mechanism, it is likely that the tendency of composition of the present invention organizes into clusters, aggregates, or gas-filled bubbles provides a platform for reactions to occur by increasing localized concentrations of reactants, lowering the transition of energy required for a catalytic reaction to occur, or some other mechanism which has not yet been described. It has been established that the non-ionic surfactants used in the composition of the present invention are compatible with and enhance enzymatic reactions. The composition of the present invention has catalytic activities that is more like the catalytic activities of functionalized surfactants than conventional enzyme systems.

The composition of the present invention comprises a yeast fermentation supernatant, preservatives and a non-ionic surfactant, in the absence of an anionic or cationic surfactant.

Non-ionic surfactants suitable for use in the present invention include, but are not limited to, polyether non-ionic surfactants comprising fatty alcohols, alkyl phenols, fatty acids and fatty amines which have been ethoxylated; polyhydroxyl non-ionic (polyols) typically comprising sucrose esters, sorbital esters, alkyl glucosides and polyglycerol esters which may or may not be ethoxylated. In one embodiment of the present invention surfactants such as those sold under the tradename WITCONOL and in particular WITCONOL SN-70 and WITCONOL TD-90 are used. In another embodiment of the invention surfactants having the general formulae $4\text{-}(C_8H_{17})C_6H_4O(CH_2CH_2O)_n CH_2CH_2OH$ are used. The non-ionic surfactant acts synergistically to enhance the action of the yeast fermentation supernatant.

The composition of the present invention is similar to that described in U.S. Pat. No. 3,635,797 to Battistoni et al., which is incorporated herein by reference. Briefly, yeast, *Saccharomyces cerevisiae*, is cultured in a medium comprising: a sugar source, such as sucrose from molasses or raw sugar, soy beans or mixtures thereof, a sugar concentration of about 10 to 30%, by weight, is used; malt such as diastatic malt is used at a concentration of about 7 to 12%, by weight, a salt, such as magnesium salts, and in particular magnesium sulfate, is used at a concentration of about 1 to 3%, by weight; and yeast is added to the medium to a final concentration of about 1 to 5%, by weight. The mixture is incubated at about 26° to about 42° C. until the fermentation is completed, i.e. until effervescence of the mixture has ceased, usually about 2 to about 5 days depending on the fermentation temperature. At the end of the fermentation the yeast fermentation composition is centrifuged to remove the "sludge" formed during the fermentation. The supernatant (about 98.59%, by weight) is mixed with sodium benzoate (about 1%, by weight), imidazolidinyl urea (about 0.01%, by weight), diazolidinyl urea (about 0.15%, by weight), calcium chloride (about 0.25%, by weight) to form fermentation intermediate. The pH is adjusted to about 3.7 to about 4.2 with phosphoric acid. The composition of the fermentation intermediate is summarized in Table I.

TABLE I

Fermentation Intermediate

| Component | %, by weight |
| --- | --- |
| Fermentation supernatant | 98.59 |
| Na benzoate | 1 |
| Imidazolidinyl urea | 0.01 |
| Diazolidinyl urea | 0.15 |
| Calcium chloride | 0.25 |
| Adjust pH | to about 3.7 to about 4.2 with phosphoric acid |

The fermentation intermediate is prepared by filling a jacketed mixing kettle with the desired quantity of the fermentation supernatant. With moderate agitation the pH is adjusted to 3.7 to 4.2 with phosphoric acid. With continuous agitation sodium benzoate, imidazolidinyl urea, diazolidinyl urea and calcium chloride are added. The temperature of the mixture is then slowly raised to about 40° C. and the mixture is agitated continuously. The temperature is maintained at about 40° C. for about one hour to ensure that all the components of the mixture are dissolved. The mixture is then cooled to about 20° to 25° C.

In the practice of the present invention the fermentation intermediate is then formulated into the composition of the present invention (final composition). Fermentation intermediate (about 5 to 20%, by weight, of the final composition) is mixed with a non-ionic surfactant (about 5 to 20%, by weight, of the final composition). Preservatives are also added to the composition. Preservatives suitable for use in the present invention are preservatives such as sodium benzoate (about 0.1 to 0.3%, by weight, of the final composition), imidazolidinyl urea (about 0.01%, by weight, of the final composition) and diazolidinyl urea (about 0.15%, by weight, of the final composition) and mixtures thereof. In some cases a nitrogen source such as urea or ammonium nitrate (about 9%, by weight, of the final composition) may be added to the final composition. In particular the nitrogen source is added for composition which are to be used to treat soils, liquids or air. However, for composition which are to be used to treat surfaces the residue which may be left by the nitrogen compound is undesirable and may be omitted from such compositions. The pH of the final composition is adjusted to about 3.5 to about 4.0 with an acid such as citric acid or phosphoric acid.

In a preferred embodiment of the present invention the final composition comprises about 5 to 20%, by weight, fermentation intermediate, about 5 to 20%, by weight, non-ionic surfactant, about 0.1 to 3%, by weight, sodium benzoate, about 0.01%, by weight, imidazolidinyl urea and about 0.15%, by weight, diazolidinyl urea. Additionally the composition may include and about 9%, by weight, ammonium nitrate. The pH of the final composition is adjusted to about 3.5 to about 4.0 with phosphoric acid (see Table II).

TABLE II

Final Composition

| Component | %, by weight added |
| --- | --- |
| Ammonium nitrate | 0 to 9 |
| Non-ionic surfactant | 5 to 20 |
| Sodium benzoate | 0.1 to 0.3 |
| Imidazolidinyl urea | 0.01 |
| Diazolidinyl urea | 0.15 |
| Fermentation Intermediate | 5 to 20 |

The method for preparing the final composition is to charge a mixing kettle with the desired volume of water at about 20° to about 25° C. Imidazolidinyl urea, diazolidinyl urea and ammonium nitrate, are each added, in order, with agitation and the mixture is agitated to dissolve and disperse all the compounds. Non-ionic surfactant is then added and the mixture is blended until the solids are dissolved. The fermentation intermediate is then added with gentle agitation. The pH is adjusted to about 3.4 to about 4.0 with phosphoric acid.

The final concentration of components in the final composition are summarized in Table III.

TABLE III

Final Composition

| Component | %, by weight, final concentration |
| --- | --- |
| Na benzoate | 0.1 to 0.3 |
| Ammonium nitrate | 0 to 9 |
| Nonionic surfactant | 5 to 20 |
| Calcium chloride | 0.05 |
| Imidazolidinyl urea | 0.01 |
| Diazolidinyl urea | 0.15 |
| Fermentation supernatant | 5 to 20 (clarified) |
| pH | 3.5 to 4.0 |

For use the final composition is diluted. For treating hydrocarbons discharged into water, the final composition is diluted about 1:15 with water and is applied to the hydrocarbons at a rate of about 4 gallons for 1,000 square feet of, for example, an oil spill. For spills which are of a heavy consistency, the diluted mixture is preferably applied at a rate of about 1.3 gallons for 1,000 square feet of spill and the diluted final composition is preferably applied over a period of three consecutive days. It is also preferred that the diluted final composition is applied as a high pressure, preferably above about 500 psi, spray to the spill.

For soil contamination the final composition is diluted about 1:30 to about 1:15 with water and is applied at a rate of about 4 gallons for 10 cubic yards of soil. Diluted final composition, diluted to about 1:30 is used for lightly contaminated soil and final composition diluted to about 1:15 is used for heavily contaminated soils.

The composition of the present invention has high soil penetration as the composition significantly reduces surface tension, thus facilitating deep and rapid penetration into a variety of soils. Additionally, the composition removes volatile and airborne contamination resulting in the removal of noxious odors generated by the contaminants.

For use in the treatment of surfaces, the final composition is diluted about 1:10 to about 1:100. However, under some conditions the final composition may be used at a higher or lower concentration.

Those skilled in the art are aware that dilutions of such compositions can be used and that over-dilution for a particular purpose can result in a decreased rate of digestion and therefore, effectiveness of the composition and that under-dilution for a particular purpose increases cost without increasing the rate of degradation or effectiveness. Ideally, the final composition is diluted to optimize the rate of degradation or effectiveness and to minimize costs.

For use, the composition of the present invention is diluted into water, preferably at a temperature of about 38° to about 60° C. While the composition is active below about 38° C. the activity is reduced. The composition is also active at temperatures above about 60° C., however, at these elevated temperatures the composition is less stable and is denatured at a greater rate than at lower temperatures. Preferably, the diluted compositions of the present invention are used immediately after dilution into the about 38° to about 60° C. water.

The diluted composition of the present invention is preferably applied to a surface to be cleaned under pressure (i.e. power washing). To treat airborne volatile hydrocarbons (VOC's) a light mist of the composition of the present invention is sprayed in the air for about 10 minutes. The composition removes volatile and airborne contamination resulting in the removal of noxious odors generated by the contaminants.

EXAMPLE 1

Comparison of the Fermentation Intermediate of U.S. Pat. No. 3,635,797 and the Final Compound of the Present Invention The present invention is a modification of the fermentation composition described in U.S. Pat. No. 3,635,797. The fermentation intermediate of U.S. Pat. No. 3,635,797 and the composition of the present invention are set forth for comparison in Table IV.

TABLE IV

| Component | U.S. Pat. No. 3,635,797 (%, by weight) | Final Composition (%, by weight) |
|---|---|---|
| Na benzoate | 0 | 0.1 to 0.3 |
| Anionic surfactants | 20 | 0 |
| Nonionic surfactants | 18 | 5 to 20 |
| Inorganic surfactants | 25 | 0 |
| Lactic acid | 9 | 0 |
| Citric acid | 1.7 | 0 |
| Urea | 40 | 0 |
| Ammonium nitrate | 0 | 0 to 9 |
| Pine oil | 3.5 | 0 |
| Calcium chloride | 0 | 0.05 |
| Imidazolidinyl urea | 0 | 0.01 |
| Diazolidinyl urea | 0 | 0.15 |
| Fermentation super | 22 | 5 to 20 (clarified) |
| Adjust pH | about 3.0 with citric acid | about 3.5 to 4.0 with phosphoric acid |

The elimination of anionic surfactants and inorganic surfactants increased the performance of the final formulation in its ability to degrade hydrocarbons. The addition of imidazolidinyl urea, diazolidinyl urea and sodium benzoate increased the stability of the final formulation by inhibiting degradation of the fermentation supernatant. Centrifugation to form the fermentation supernatant resulted in a decrease of particulate matter which resulted in residue which can reduce the ability of the composition to penetrate soil.

EXAMPLE 2

Soil Test of the Composition of the Present Invention

The test site included runoff gas, diesel and oils from a blacktop-coated fueling area. The contamination of the surrounding soil had been occurring for a number of years. The surface area treated was approximately 6-feet wide by 7-feet long and 22 to 27 inches deep. The composition of the present invention (9%, by weight, ammonium nitrate; 12.5%, by weight, WITCONOL-70; 0.1%, by weight, sodium benzoate; 0.01%, by weight, imidazolidinyl urea; 0.15%, by weight, diazolidinyl urea and 20%, by weight, fermentation supernatant) was diluted 1:8 with water. One-and-one-half gallons of the diluted mixture was applied evenly to the soil with a pressure sprayer. Diluted composition was reapplied every two days over a period of six days, i.e. three applications of 4 gallons were made. On the day after the second and third application about 5 gallons of 100° F. water was applied to the test soil site. During the test period the temperatures were 30° to 55° F. and several rain showers were encountered.

Samples of the soil were taken prior to and after the treatment. The contamination present in the soil was reduced from 1,800 ppm prior to treatment to 400 ppm after treatment.

EXAMPLE 3

Septic Tank Treatment

A septic tank in an industrial park which houses several automotive repair shops was the subject of the treatment. The septic tank did not meet local effluent standards with regard to hydrocarbon contamination. The tank size was 1,800 gallons. Four gallons of the composition of the present invention (9%, by weight, ammonium nitrate; 12.5%, by weight, WITCONOL-70; 0.1%, by weight, sodium benzoate; 0.01%, by weight, imidazolidinyl urea; 0.15%, by weight, diazolidinyl urea and 20%, by weight, fermentation supernatant) was added to the septic tank. A sample was taken prior to the addition of the composition and a second sample was removed after four days treatment. The samples were tested for hydrocarbons and the test results are summarized in Table V.

TABLE V

| Compound | $\mu$g/l Prior to treatment | $\mu$g/l After treatment |
|---|---|---|
| Toluene | 1,695 | 45.4 |
| p-xylene | 243 | 7.9 |

The product of the present invention resulted in a reduction in the hydrocarbons toluene and p-xylene to well within the local effluent standards.

EXAMPLE 4

Treatment of Soil Contaminated with Hydrocarbons

Soil samples were obtained and 21 liters of the soil samples were added separately to glass reaction vessels (61 cm×25.4 cm×25.4 cm). Each of the samples was "spiked" with 200 ml of JP-7 fuel to give about 5 g of fuel/kg of soil. The samples and JP-7 fuel were mixed thoroughly. Samples were taken ("0" day samples) and reaction mixtures were added to each of the reaction vessels as indicated in Tables VI and VII. Two hundred ml of each the mixtures (i.e. 200 ml of the surfactant mixture and 200 ml of the bio-catalyst mixture) were added to a corresponding soil sample test. The soil sample tests were maintained at 22° C., a relative humidity of 45 to 60% and soil water content of 40 to 60%.

Sample were taken on days 1, 3, 7, 14, 21 and 28. The samples were analyzed for total petroleum hydrocarbons and soluble total petroleum hydrocarbons using EPA methods 8015M, GCFID/5030 and 8020. Soluble total petroleum hydrocarbons were extracted from the soil with deionized water and analyzed as described above for the total petroleum hydrocarbons. The results of the study are summarized in Tables VI and VII.

The analysis of the total petroleum hydrocarbons showed that there was no difference between treated and control samples. This was due to the rapid evaporation of the total petroleum hydrocarbons from the soil samples.

TABLE VI

Total TPH After Treatment

| Test Sample/Day | 0 | 1 | 3 | 7 | 14 | 21 | 28 |
|---|---|---|---|---|---|---|---|
| 20% S:0% B[1] | 6900 | 5500 | 4700 | 4200 | 4400 | 2300 | 2600 |
| No Bio-catalyst | (1) | (0.8) | (0.68) | (0.61) | (0.64) | (0.33) | (0.38) |
| 0% S:0% B Non- | 8200 | 6000 | 4800 | 4200 | 3000 | 2100 | 1300 |
| Autoclave | (1) | (0.73) | (0.59) | (0.51) | (0.37) | (0.26) | (0.16) |
| control[2] | | | | | | | |
| 10% S:10% B | 8500 | 6500 | 5100 | 4100 | 3800 | 2700 | 1900 |
| | (1) | (0.76) | (0.6) | (0.48) | (0.45) | (0.32) | (0.22) |
| 0% S:0% B | 5400 | 4000 | 3400 | 1800 | 670 | 590 | 470 |
| Autoclave | (1) | (0.74) | (0.63) | (0.33) | (0.12) | (0.11) | (0.09) |
| control[2] | | | | | | | |
| 10% S/10% B | 1800 | 1000 | 5800 | 770 | 750 | 440 | — |
| | (1) | (0.56) | (3.22) | (0.43) | (0.42) | (0.24) | |
| 10% S:10% B Spiked | 8700 | 4800 | 6600 | 4200 | 3100 | 3100 | 2100 |
| with MTBE[4] | (1) | (0.55) | (0.76) | (0.48) | (0.36) | (0.36) | (0.24) |
| 10% S/10% B | 8700 | 5300 | 6300 | 2800 | 2300 | 2600 | 1300 |
| | (1) | (0.61) | (0.72) | (0.32) | (0.26) | (0.3) | (0.15) |
| 20% S/20% B | 7300 | 5300 | 6500 | 5600 | 3700 | 2700 | 1300 |
| | (1) | (0.23) | (0.89) | (0.77) | (0.51) | (0.37) | (0.18) |
| 20% S/10% B | 7500 | 5500 | 4500 | 5000 | 3500 | 3200 | 2000 |
| | (1) | (0.73) | (0.6) | (0.67) | (0.47) | (0.43) | (0.27) |
| 20% S/5% B | 8000 | 6800 | 5900 | 5400 | 4000 | 2700 | 2200 |
| | (1) | (0.85) | (0.74) | (0.68) | (0.5) | (0.34) | (0.38) |
| 10% S/20% B | 7800 | 6300 | 4400 | 3700 | 2700 | 2400 | 2500 |
| | (1) | (0.81) | (0.56) | (0.47) | (0.35) | (0.31) | (0.32) |
| 10% S/5% B | 8700 | 6500 | 5100 | 3600 | 4000 | 2100 | 1600 |
| | (1) | (0.75) | (0.59) | (0.41) | (0.46) | (0.24) | (0.18) |
| 5% S/20% B | 7600 | 6100 | 4300 | 3900 | 2900 | 1400 | 1400 |
| | (1) | (0.7) | (0.49) | (0.45) | (0.33) | (0.16) | (0.16) |
| 5% S/10% B | 8100 | 5600 | 5100 | 2700 | 1300 | 1300 | 2000 |
| | (1) | (0.69) | (0.63) | (0.33) | (0.16) | (0.16) | (0.25) |
| 5% S/5% B | 8400 | 5400 | 4900 | 5100 | 2000 | 1600 | 1900 |
| | (1) | (0.64) | (0.58) | (0.61) | (0.24) | (0.19) | (0.23) |
| 0% S/10% B | 10000 | 6200 | 3900 | 4400 | 1500 | 1300 | 1400 |
| No Surfactant | (0.1) | (0.62) | (0.39) | (0.44) | (0.15) | (0.13) | (0.14) |
| 10% S/0% B | 8000 | 5500 | 3900 | 3100 | 2600 | 1000 | 1900 |
| No Bio-catalyst | (1) | (0.69) | (0.49) | (0.39) | (0.33) | (0.13) | (0.24) |

[1]%, by weight, of surfactant (S) and %, by weight, bio-catalyst (B) used for each treatment.
[2]The autoclave and non-autoclave controls are included to determine the effect and extent of hydrocarbon digesting bacteria naturally present in the soil samples. The autoclave control was autoclaved for 30 minutes at 15 psi and 121° C. A sample of the soil was analyzed for microorganisms after the autoclaving procedure to ensure that all microorganisms were eliminated from the smaple.
[3]Values (x) are the ratio of the concentration of the hydrocarbons at time t divided by the initial concentration of the hydrocarbons.

TABLE VII

Soluble TPH After Treatment

| Test Sample/Day | 0 | 1 | 3 | 7 | 14 | 21 | 28 |
|---|---|---|---|---|---|---|---|
| 20% S:0% B[1] | 75 | 76 | 52 | 53 | 42 | 52 | 39 |
| No Bio-catalyst | (1)[3] | (1.01) | (0.69) | (0.71) | (0.56) | (0.69) | (0.52) |
| 0% S:0% B Non- | 70 | 52 | 52 | 61 | 49 | 45 | 51 |
| Autoclave control[2] | (1) | (0.74) | (0.74) | (0.87) | (0.7) | (0.64) | (0.73) |
| 10% S:10% B | 120 | 11 | 0.94 | 23 | 24 | 14 | 6.5 |
| | (1) | (0.09) | (0.01) | (0.19) | (0.2) | (0.12) | (0.05) |
| 0% S:0% B | 30 | 18 | 24 | 29 | 33 | 34 | 27 |
| Autoclave control | (1) | (0.6) | (0.8) | (0.97) | (1.1) | (1.13) | (0.9) |
| 10% S/10% B | 17 | 11 | 5.8 | 1 | 1.4 | 0.42 | — |
| | (1) | (0.65) | (0.34) | (0.06) | (0.08) | (0.25) | |
| 10% S:10% B Spiked | 75 | 14 | 0.21 | 9.4 | 17 | 7.4 | 10 |

TABLE VII-continued

Soluble TPH After Treatment

| Test Sample/Day | 0 | 1 | 3 | 7 | 14 | 21 | 28 |
|---|---|---|---|---|---|---|---|
| with MTBE[4] | (1) | (0.19) | (0) | (0.13) | (0.23) | (0.1) | (0.13) |
| 10% S/10% B | 70 | 8.2 | 14 | 5.6 | 0.77 | 11 | 8.8 |
|  | (1) | (0.12) | (0.2) | (0.08) | (0.01) | (0.16) | (0.13) |
| 20% S/20% B | 100 | 8.1 | 14 | 6.8 | 8.5 | 3.8 | 8.8 |
|  | (1) | (0.08) | (0.14) | (0.07) | (0.09) | (0.04) | (0.09) |
| 20% S/10% B | 130 | 17 | 14 | 4.2 | 7.5 | 2.5 | 0.15 |
|  | (1) | (0.13) | (0.11) | (0.03) | (0.06) | (0.02) | (0.0) |
| 20% S/5% B | 120 | 15 | 14 | 11 | 13 | 2.6 | 6.9 |
|  | (1) | (0.13) | (0.12) | (0.09) | (0.11) | (0.02) | (0.06) |
| 10% S/20% B | 61 | 16 | 6.7 | 5.6 | 12 | 5.1 | 8.8 |
|  | (1) | (0.26) | (0.11) | (0.09) | (0.2) | (0.08) | (0.14) |
| 10% S/5% B | 46 | 23 | 9.5 | 7.4 | 26 | 3.7 | 4.3 |
|  | (1) | (0.93) | (0.21) | (0.16) | (0.57) | (0.08) | (0.09) |
| 5% S/20% B | 69 | 21 | 13 | 6.4 | 19 | 17 | 9.3 |
|  | (1) | (0.3) | (0.19) | (0.09) | (0.28) | (0.25) | (0.13) |
| 5% S/10% B | 96 | 17 | 16 | 16 | 27 | 14 | 11 |
|  | (1) | (0.18) | (0.17) | (0.17) | (0.28) | (0.15) | (0.11) |
| 5% S/5% B | 57 | 21 | 23 | 25 | 40 | 37 | 20 |
|  | (1) | (0.37) | (0.4) | (0.44) | (0.7) | (0.65) | (0.35) |
| 0% S/10% B | 100 | 25 | 11 | 37 | 44 | 60 | 34 |
| No Surfactant | (1) | (0.25) | (0.11) | (0.37) | (0.44) | (0.6) | (0.34) |
| 10% S/0% B | 63 | 35 | 39 | 50 | 21 | 21 | 4.2 |
| No B10-catalyst | (1) | (0.56) | (0.62) | (0.79) | (0.33) | (0.33) | (0.07) |

[1] %, by weight, of surfactant (S) and %, by weight, bio-catalst (B) used for each treatment.
[2] The autoclave and non-autoclave controls are included to determine the effect and extent of hydrocarbon digesting bacteria naturally present in the soil samples. The autoclave control was autoclaved for 30 minutes at 15 psi and 121° C. A sample of the soil was anaylzed for microorganisms after the autoclaving procedure to ensure that all microorganisms were eliminated from the sample.
[3] Values (x) are the ratio of the concentration of the hydrocarbons at time t divided by the initial concentration of the hydrocarbons.

The analysis of the soluble total petroleum hydrocarbons showed that samples treated with a combination of surfactant and bio-catalyst resulted in a decrease in the soluble total petroleum hydrocarbons over any decrease observed in control samples which included no surfactant and no bio-catalyst, no surfactant or no bio-catalyst.

EXAMPLE 5

Washing Aluminum Cans

A 1%, solution of the composition of the present invention (9%, by weight, ammonium nitrate; 12.5%, by weight, WITCONOL-70; 0.1%, by weight, sodium benzoate; 0.01%, by weight, imidazolidinyl urea; 0.15%, by weight, diazolidinyl urea and 20%, by weight, fermentation supernatant) was added to a second stage of a five stage aluminum can washer. Stage 1 (pre-rinse) and stage 2 (wash) were maintained at 38° C. All other stages (rinses) were maintained at ambient temperature. Stage 1 and 2 were run at 25 to 40 psi washer head pressures. All the rinse stages (stages 3, 4 and 5) were run at 3 psi for top washer headers and 5 psi for lower washer head pressure. The cans were exposed to the composition of the present invention for about 1 minute. Washing with the composition of the present invention was a substitute for sulfuric acid washing.

The cans washed with the composition of the present invention were found to have excellent enamel rating readings (ERR). Coatings used for the cans sprayed well onto the cleaned cans. The washing procedure did not damage ink or overcoat adhesion. The cans washed with the composition of the present invention were superior, in all aspects studied, than conventional sulfuric acid washed cans.

The present invention is not to be limited to the specific embodiments shown which are merely illustrative. Various and numerous other embodiments may be devised by one skilled in the art without departing from the spirit and scope of this invention.

What is claimed is:

1. A composition for accelerating the decomposition of hydrocarbons comprising a non-ionic surfactant at a concentration of about 5 to 20%, by weight; ammonium nitrate at a concentration of about 4 to 9%, by weight: sodium benzoate at a concentration of about 0.1 to 0.3%, by weight; imidazolidinyl urea at a concentration of about 0.01%, by weight; diazolidinyl urea at a concentration of about 0.15%, by weight; and a fermentation intermediate supernatant derived from a *Saccharomyces cerevisiae* culture at a concentration of about 5 to 20%, by weight.

2. A composition for accelerating the decomposition of hydrocarbons consisting essentially of: a non-ionic surfactant; ammonium nitrate; sodium benzoate; imidazolidinyl urea; diazolidinyl urea; and a fermentation supernatant derived from a *Saccharomyces cerevisiae* culture.

3. A composition as recited in claim 2 wherein the non-ionic surfactant is present at a concentration of about 5 to 20%, by weight; the ammonium nitrate is present at a concentration of about 4 to 9%, by weight; the sodium benzoate is present at a concentration of about 0.1 to 0.3%, by weight; the imidazolidinyl urea is present at a concentration of about 0.01%, by weight; the diazolidinyl urea is present at a concentration of about 0.15%, by weight; and the fermentation intermediate supernatant derived from a *Saccharomyces cerevisiae* culture is present at a concentration of about 5 to 20%, by weight.

4. A method of accelerating the decomposition of hydrocarbons comprising applying an aqueous composition consisting essentially of ammonium nitrate, a non-ionic surfactant, a preservative and a fermentation supernatant derived from a *Saccharomyces cerevisiae* culture to hydrocarbons to be decomposed.

5. A method as recited in claim 4 wherein the non-ionic surfactant is present at a concentration of about 0.1 to about 0.4%, by weight, the ammonium nitrate is present at a concentration of about 4 to 9%, by weight; the preservative is present at a concentration of about 0.018 to about 0.008%, by weight, and the fermentation supernatant derived from a Saccharomyces is present at a concentration of about 0.1 to about 0.4%, by weight.

6. A method as recited in claim 4 wherein the aqueous composition is applied at a rate of about 1.3 to about 4 gallons/1,000 square feet of surface area for liquid hydrocarbons.

7. A method as recited in claim 4 wherein the composition is applied at a rate of about 4 gallons/10 cubic yards for the treatment of soil contamination.

8. A method as recited in claim 4 wherein the composition is applied to the hydrocarbons by spraying at a pressure of about 500 psi.

9. A method as recited in claim 4 wherein the aqueous composition is used at a temperature of at a 38° to about 60° C.

10. A method as recited in claim 4 wherein the hydrocarbons to be degraded a reselected from the group consisting of solid hydrocarbons, liquid hydrocarbons and airborne hydrocarbons.

11. A method of accelerating the decomposition of hydrocarbons comprising applying an aqueous composition comprising: about 0.1 to about 0.4%, by weight, non-ionic surfactant; about 4 to 9%, by weight, ammonium nitrate; about 0.007 to about 0.003%, by weight, sodium benzoate; about 0.0007 to about 0.0003% by weight, imidazolidinyl urea; about 0.01 to about 0.005%, by weight, diazolidinyl urea; and about 0.1 to about 0.4%, by weight, fermentation supernatant derived from a *Saccharomyces cerevisiae* culture to hydrocarbons to be decomposed.

12. A method as recited in claim 11 wherein the composition is applied at a rate of about 1.3 to about 4 gallons/1,000 square feet of surface area for liquid hydrocarbons.

13. A method as recited in claim 11 wherein the composition is applied at a rate of about 4 gallons/10 cubic yards for the treatment of soil contamination.

14. A method as recited in claim 11 wherein the composition is applied to the hydrocarbons by spraying at a pressure of about 500 psi.

15. A method as recited in claim 11 wherein the aqueous composition is used at a temperature of at a 38° to about 60° C.

16. A method as recited in claim 11 wherein the hydrocarbons to be degraded are selected from the group consisting of solid hydrocarbons, liquid hydrocarbons and airborne hydrocarbons.

* * * * *